United States Patent
Moon et al.

(10) Patent No.: US 7,983,552 B2
(45) Date of Patent: Jul. 19, 2011

(54) CAMERA FLASH LENS AND PORTABLE DEVICE INCLUDING THE SAME

(75) Inventors: Kyung Mi Moon, Suwon (KR); Jin Ha Kim, Seoul (KR)

(73) Assignee: Samsung LED Co., Ltd., Suwon, Gyunggi-do (KR)

( * ) Notice: Subject to any disclaimer, the term of this patent is extended or adjusted under 35 U.S.C. 154(b) by 0 days.

(21) Appl. No.: 12/580,150

(22) Filed: Oct. 15, 2009

(65) Prior Publication Data
US 2010/0178046 A1 Jul. 15, 2010

(30) Foreign Application Priority Data
Jan. 9, 2009 (KR) .................. 10-2009-0001977

(51) Int. Cl.
*G03B 15/03* (2006.01)
*H04N 5/222* (2006.01)
*H01L 33/00* (2010.01)

(52) U.S. Cl. ........... 396/155; 348/371; 257/98; 257/100

(58) Field of Classification Search .................. 396/155, 396/176; 348/371; 257/98, 100
See application file for complete search history.

(56) References Cited

U.S. PATENT DOCUMENTS
2004/0207749 A1* 10/2004 Takenaka ........................ 348/371
2007/0034890 A1* 2/2007 Daschner et al. .............. 257/100
2008/0142822 A1 6/2008 Kim et al.

FOREIGN PATENT DOCUMENTS
KR 0770424 10/2007

* cited by examiner

*Primary Examiner* — Rochelle-Ann J Blackman
(74) *Attorney, Agent, or Firm* — McDermott Will & Emery LLP

(57) ABSTRACT

A camera flash lens for a plurality of light emitting diodes (LEDs) mounted on a board and serving as a light source of a camera flash, includes a plurality of annular lenses corresponding to the plurality of LEDs, respectively. The plurality of annular lenses each include an edge portion extending toward the board to reflect and collect light emitted from the edge of a corresponding LED of the plurality of LEDs, and a central portion having an inner surface with a Fresnel shape or a curved shape to collect light emitted from the top of the corresponding LED.

14 Claims, 3 Drawing Sheets

CAMERA FLASH LENS AND PORTABLE DEVICE INCLUDING THE SAME

CROSS-REFERENCE TO RELATED APPLICATIONS

This application claims the priority of Korean Patent Application No. 10-2009-0001977 filed on Jan. 9, 2009, in the Korean Intellectual Property Office, the disclosure of which is incorporated herein by reference.

BACKGROUND OF THE INVENTION

1. Field of the Invention

The present invention relates to a camera flash lens and a portable device including the same, and more particularly, to a camera flash lens which can efficiently concentrate light, emitted from a plurality of light emitting diodes (LEDs) serving as a light source of a camera flash, within the angle of view of a camera, and a portable device including the same.

2. Description of the Related Art

Recently, increasing numbers of portable devices have been provided with camera features. These portable devices may include flashes to provide a sufficient amount of light for low-light photography.

In this regard, a white light emitting diode (LED) is increasingly being used as a light source of a camera flash.

For example, a camera flash, employing an LED as its light source, may utilize an exterior cover and a reflector provided with a reflective surface having a high reflectance level and designed to adjust the angle of radiation emitted by the LED within the angle of view of a camera. Alternatively, such a camera flash may utilize a flash lens, a mechanism that fixes the flash lens, and an LED package in an integral package.

However, the above methods may entail complicated structures. Also, it is not easy to manufacture a camera flash employing a separate component to allow the angle of radiation of an LED to coincide with the angle of view of a camera.

For this reason, in the case that an LED is used as a light source of a camera flash, the need arises to develop a flash lens that allows light from the LED to be emitted within the angle of view of a camera with a simple structure. In particular, a flash lens needs to narrow the angle of radiation of an LED, which ranges from 120° to 130°, to the angle of view of a camera (56° in width and 48° in length), so that light is emitted within the angle of view of the camera.

Even in the case of utilizing two or more LEDs to increase the intensity of illumination, the need is increasing for flash lenses allowing light to be effectively emitted within the angle of view of cameras.

SUMMARY OF THE INVENTION

An aspect of the present invention provides a camera flash lens, which can efficiently concentrate light, emitted from a plurality of light emitting diodes (LEDs) serving as a light source of a camera flash, within the angle of view of a camera, and a portable device including the same.

According to an aspect of the present invention, there is provided a camera flash lens, for a plurality of light emitting diodes (LEDs) mounted on a board and serving as a light source of a camera flash, including a plurality of annular lenses corresponding to the plurality of LEDs, respectively, and each including: an edge portion extending toward the board to reflect and collect light emitted from an edge of a corresponding LED of the plurality of LEDs; and a central portion having an inner surface with a Fresnel shape or a curved shape to collect light emitted from a top of the corresponding LED.

The edge portions of the camera flash lens may contact each other.

The edge portions of the camera flash lens may be conjoined, forming a boundary therebetween. The boundary may extend toward the board.

The edge portions of the camera flash lens may be conjoined without a boundary therebetween.

The central portion of the camera flash lens may correspond to the center of the corresponding LED.

The edge portion of the camera flash lens may have an outer circumference being at an acute angle to an optical axial direction from the board toward the annular lens.

The camera flash lens may be formed of an acrylic material.

According to another aspect of the present invention, there is provided a portable device including: a plurality of light emitting diodes (LEDs) provided as a light source; a board on which the plurality of LEDs are mounted; and a plurality of annular lenses corresponding to the plurality of LEDs, respectively, the plurality of annular lenses each including an edge portion extending toward the board to reflect and collect light emitted from an edge of a corresponding LED of the plurality of LEDs; and a central portion having an inner surface with a Fresnel shape or a curved shape to collect light emitted from a top of the corresponding LED.

The edge portions of the portable device may contact each other.

The edge portions of the portable device may be conjoined, forming a boundary therebetween. The boundary may extend toward the board.

The edge portions of the portable device may be conjoined without a boundary therebetween.

The central portion of the portable device may correspond to the center of the corresponding LED.

The edge portion of the portable device may have an outer circumference being at an acute angle to an optical axis from the board toward the annular lens.

The camera flash lens of the portable device may be formed of an acrylic material.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings. The invention may, however, be embodied in many different forms and should not be construed as limited to the embodiments set forth herein. Rather, these embodiments are provided so that this disclosure will be thorough and complete, and will fully convey the scope of the invention to those skilled in the art.

Figure 1:
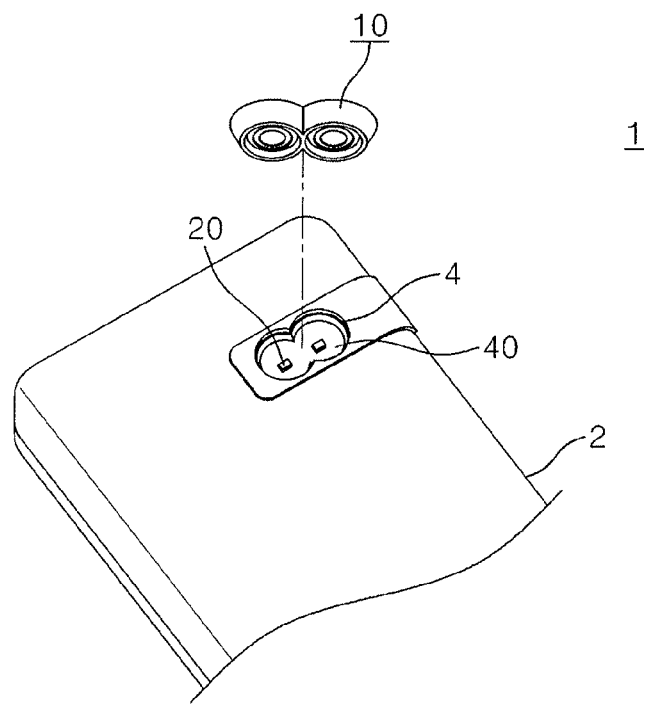
FIG. 1 is a schematic perspective view of a camera flash lens installed in a portable device according to an exemplary embodiment of the present invention.

FIG. 1 is a schematic perspective view of a camera flash lens installed in a portable device according to an exemplary embodiment of the present invention.

In FIG. 1, a mobile communication terminal 1 is illustrated as a portable device according to the present invention. A reception part 4 for the reception of a camera flash lens 10 is formed in one surface of a body 2 of the mobile communication terminal 1.

The camera flash lens 10 is installed in the body 2 in a direction oriented toward an object so as to allow for convenient image capturing. That is, the camera flash lens 10 may be placed opposite to a display unit (not shown).

A plurality of light emitting diodes (LEDs) 20 are mounted on a board 40 inside the body 2 to serve as a light source of a camera flash. In this embodiment, two mounted LEDs 20 are illustrated. These LEDs 20 are arranged in a row on the board 40, and have a wider angle of radiation (120° to 130°) than the angle of view of general cameras (56° in width and 48° in length).

Annular lenses 13 and 15 are conjoined and correspond to the LEDs 20, respectively. The annular lenses 13 and 15 serve to collect light emitted from the LEDs 20 so that the angle of radiation of the LEDs 20 corresponds to the angle of view of a camera.

Hereinafter, the camera flash lens 10 including the annular lenses 13 and 15 will be described in more detail.

Figure 2:
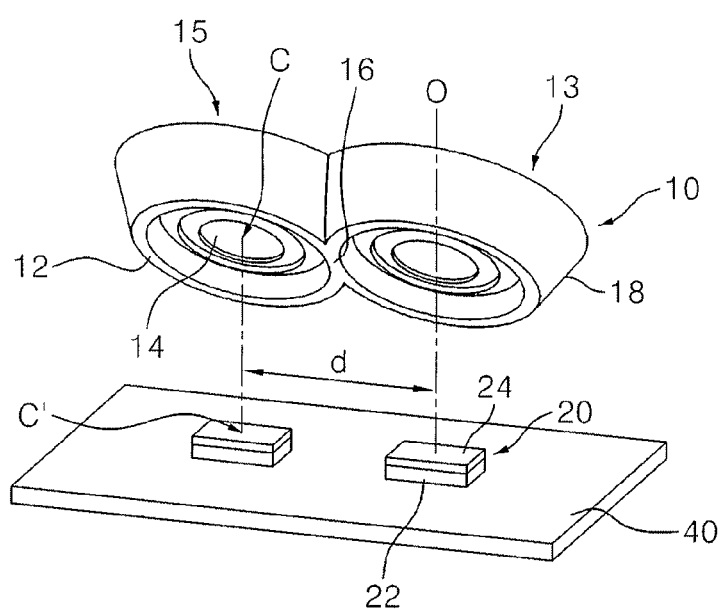
FIG. 2 is a schematic perspective view of light emitting diodes (LEDs) mounted on a board, and a camera flash lens collecting light emitted from the LEDs, according to an exemplary embodiment of the present invention.
Figure 3:
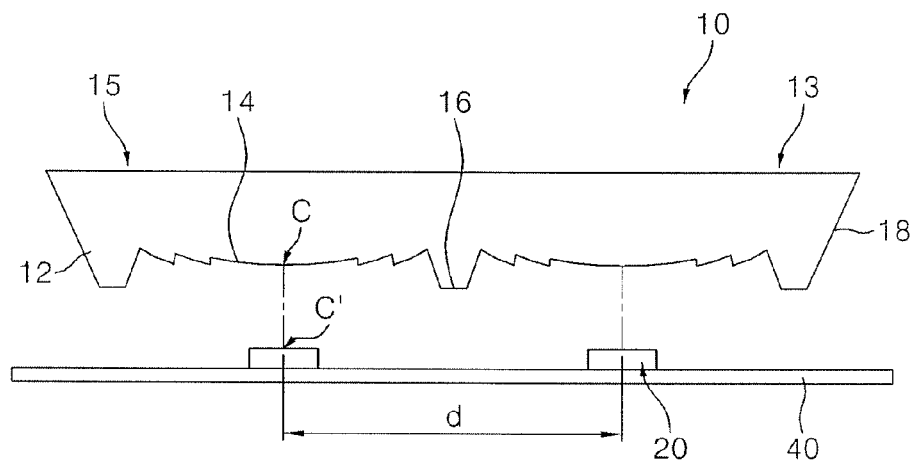
FIG. 3 is a cross-sectional view of the LEDs and the camera flash lens depicted in FIG. 2, illustrating the camera flash lens having an inner surface with a Fresnel lens shape according to an exemplary embodiment of the present invention.
Figure 4:
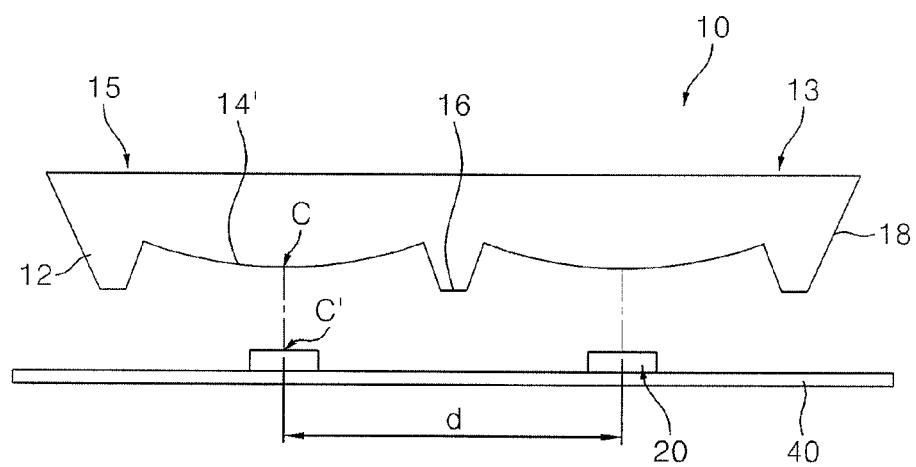
FIG. 4 is a cross-sectional view of the LEDs and the camera flash lens depicted in FIG. 2, illustrating the camera flash lens having an inner surface with a curved shape according to another exemplary embodiment of the present invention.

FIG. 2 is a schematic perspective view illustrating LEDs mounted on a board, and a camera flash lens collecting light emitted from the LEDs, according to an exemplary embodiment of the present invention. FIG. 3 is a cross-sectional view of the LEDs and the camera flash lens depicted in FIG. 2, showing the camera flash lens having an inner surface in the shape of a Fresnel lens (hereinafter, referred to as 'Fresnel shape') according to an exemplary embodiment of the present invention. FIG. 4 is a cross-sectional view of the LEDs and the camera flash lens depicted in FIG. 2, showing the camera flash lens having a curved inner surface according to another exemplary embodiment of the present invention.

Referring to FIGS. 2 through 4, the camera flash lens, 10 includes the annular lenses 13 and 15 that are conjoined. Each of the annular lenses 13 and 15 includes an edge portion 12 and a central portion 14.

The camera flash lens 10 collects light emitted from the LEDs 20 mounted on the board 40 and serving as a light source of a camera flash. A plurality of LEDs 20 are provided on the board 40 in order to ensure sufficient intensity of illumination. Therefore, the number of the annular lenses 13 and 15, collecting light emitted from the LEDs 20, needs to correspond to the number of LEDs 20.

The LEDs 20, mounted on the board 40, are spaced apart from each other at a distance (d) that allows a boundary 16 between the conjoined annular lenses 13 and 15 to be placed between the LEDs 20. The extent to which the annular lenses 13 and 15 are conjoined varies according to the distance (d) between the LEDs 20 on the board 40.

Each of the LEDs 20 includes a thin LED chip disposed on a substrate 22, and a light-transmissive material 24 surrounding the LED chip. The LED chip is covered with the light-transmissive material 24. The light-transmissive material 24 contains phosphorous bodies to convert the wavelength of a portion of light emitted from the LED chip, thereby producing white light.

The edge portion 12 extends toward the board 40 and reflects and collects light emitted from the rough edge of the corresponding LED 20. The bottom of the edge portion 12 may be at a predetermined distance from the board 40 on which the LED 20 is mounted.

In particular, the bottom of the edge 12 may be at a distance of about 0.8 mm above the board 40, and this distance may be adjusted to be either higher or lower in due consideration of productivity and performance.

The shorter the distance is, the more effectively light from the LEDs 20 can be collected. However, this may adversely affect the manufacturing and assembling processes. In contrast, the greater the distance is, the easier the manufacturing process becomes but the less light from the LED 20 is collected.

An outer circumference 18 of the edge portion 12 may be inclined at an acute angle to the optical axial direction (O) from the board 40 toward the camera flash lens 10. By constructing the outer circumference 18 in the above manner, light can be emitted from the LED 20 outwardly within the angle of view of a camera.

The central portion 14 is provided as a recess inside the edge portion 12. The inner surface of the recess has a Fresnel shape, or a curved shape 14' depicted in FIG. 4.

The central portion 14 having the inner surface of the curved shape 14' may have its convex center oriented toward the corresponding LED 20 to ensure the effective emission of light from the LED 20.

The recess may have a depth of about 1 mm and be spaced apart from the top of the LED 20 at a distance of about 0.35 mm. In particular, the depth of the recess is closely associated with the formation of the Fresnel shape.

If the recess has a depth exceeding 1 mm, a sawtooth portion of the Fresnel shape needs to protrude more for lens performance. If the recess has a depth of less than 1 mm, the sawtooth portion of the Fresnel shape needs to protrude less.

The further the sawtooth portion of the Fresnel shape protrudes, the more difficult the manufacturing process becomes. In contrast, the less the sawtooth portion of the Fresnel shape protrudes, the more the manufacturing process is facilitated. That is, the degree of difficulty of the manufacturing process is determined by the extent to which the sawtooth portion of the Fresnel shape protrudes. Therefore, the depth of the recess needs to be determined regarding the extent to which the sawtooth portion protrudes.

The Fresnel shape allows for the effective radiation of light from the LED 20. The center (c) of the central portion 14 corresponds to the center (c') of the LED 20.

The camera flash lens 10 needs to be formed of a material that can be processed and molded easily since it is subject to processing in regard to its thicknesses, recess and Fresnel shape. The camera flash lens 10 may utilize a plastic material, and an acrylic material with high workability, such as acrylic or poly methyl methacrylate (PMMA) may be used.

Figure 5:
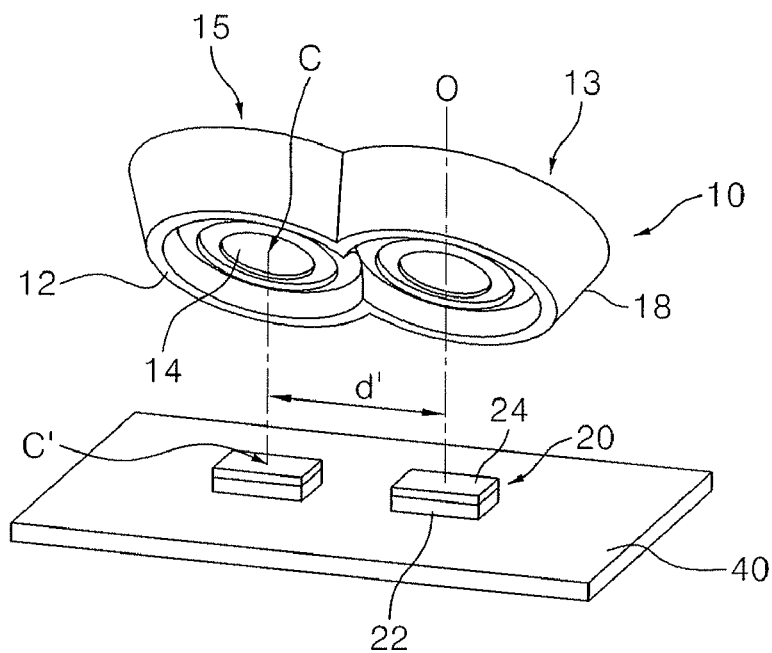
FIG. 5 is a schematic perspective view of light emitting diodes (LEDs) mounted on a board, and a camera flash lens collecting light emitted from the LEDs, according to another exemplary embodiment of the present invention.
Figure 6:
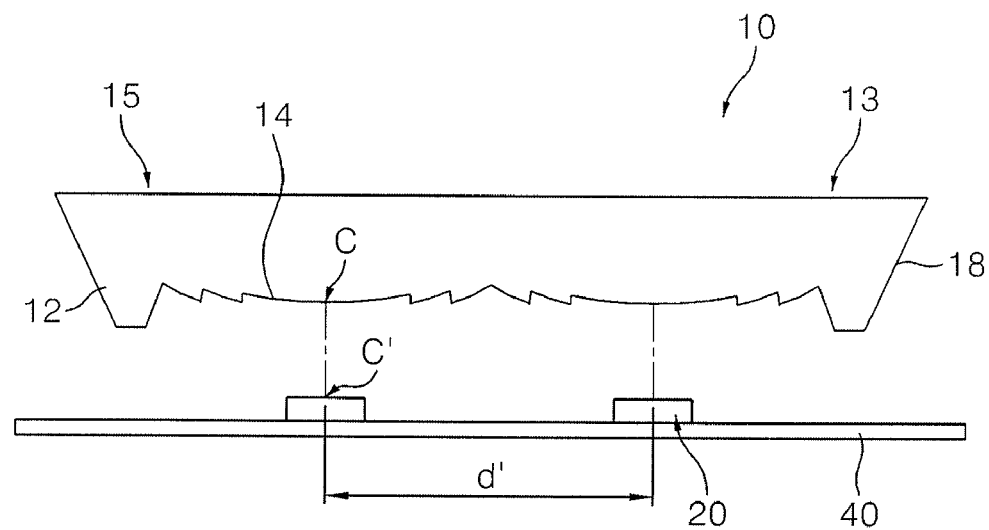
FIG. 6 is a cross-sectional view of the LEDs and the camera flash lens depicted in FIG. 5.

FIG. 5 is a schematic perspective view illustrating LEDs mounted on a board, and a camera flash lens collecting light emitted from the LEDs, according to another exemplary embodiment of the present invention. FIG. 6 is a cross-sectional view of the LEDs and the camera flash lens depicted in FIG. 5.

Referring to FIGS. 5 and 6, the camera flash lens 10, according to another exemplary embodiment of the present invention, includes the annular lenses 13 and 15 that are conjoined. The annular lenses 13 and 15 each include the edge portion 12 and the central portion 14.

The annular lenses 13 and 15 are conjoined more so than they are in the embodiments of FIGS. 2 through 4, thus having no boundary 16 that divides the central portions 14 of the annular lenses 13 and 15. The central portions 14 of the conjoined annular lenses 13 and 15 have no distinctive boundary therebetween.

The extent to which the edge portions 12 are conjoined may be determined within the range that does not cause the two annular lenses 13 and 15 to be combined fully and thus form a circle.

According to this embodiment, the central portion 14 having a Fresnel shape is illustrated, but the central portion 14 may also have a curved shape.

According to this embodiment, the distance (d') between the LEDs 20 mounted on the board 40 is shorter than the distance (d) in the embodiments of FIGS. 2 through 4. Here, the minimum distance (d') between the LEDs 20 mounted on the board 40 may be set to the distance when the LEDs 20 contact each other.

Other elements of this embodiment are substantially identical to those in the embodiments of FIGS. 2 through 4, and thus a detailed description thereof will be omitted.

In the camera flash lens and the portable device including the same according to the present invention, the plurality of LEDs and the flash lens that can reduce the angle of radiation of the LEDs with a simple structure are provided, thereby emitting light with high intensity within the angle of view of a camera.

As set forth above, according to exemplary embodiments of the invention, two or more LEDs and a flash lens having a simple structure to reduce the angle of radiation of the LEDs are provided in the camera flash lens and the portable device including the same. Accordingly, light with high intensity can be emitted over the entire angular field of view of a camera.

While the present invention has been shown and described in connection with the exemplary embodiments, it will be apparent to those skilled in the art that modifications and variations can be made without departing from the spirit and scope of the invention as defined by the appended claims.

What is claimed is:

1. A camera flash lens for a plurality of light emitting diodes (LEDs) mounted on a board and serving as a light source of a camera flash, the camera flash lens comprising a plurality of annular lenses corresponding to the plurality of LEDs, respectively, the plurality of annular lenses each comprising:
   an edge portion extending toward the board to reflect and collect light emitted from an edge of a corresponding LED of the plurality of LEDs; and
   a central portion having an inner surface with a Fresnel shape or a curved shape, the inner surface facing the board to collect light emitted from a top of the corresponding LED.

2. The camera flash lens of claim 1, wherein the edge portions contact each other.

3. The camera flash lens of claim 1, wherein the edge portions are conjoined, forming a boundary therebetween, the boundary extending toward the board.

4. The camera flash lens of claim 1, wherein the edge portions are conjoined without a boundary therebetween.

5. The camera flash lens of claim 1, wherein the central portion corresponds to the center of the corresponding LED.

6. The camera flash lens of claim 1, wherein the edge portion has an outer circumference being at an acute angle to an optical axial direction from the board toward the annular lens.

7. The camera flash lens of claim 1, wherein the camera flash lens is formed of an acrylic material.

8. A portable device comprising:
   a plurality of light emitting diodes (LEDs) provided as a light source;
   a board on which the plurality of LEDs are mounted; and
   a plurality of annular lenses corresponding to the plurality of LEDs, respectively, the plurality of annular lenses each comprising:
      an edge portion extending toward the board to reflect and collect light emitted from an edge of a corresponding LED of the plurality of LEDs; and
      a central portion having an inner surface with a Fresnel shape or a curved shape, the inner surface facing the board to collect light emitted from a top of the corresponding LED.

9. The portable device of claim 8, wherein the edge portions contact each other.

10. The portable device of claim 8, wherein the edge portions are conjoined, forming a boundary therebetween, the boundary extending toward the board.

11. The portable device of claim 8, wherein the edge portions are conjoined without a boundary therebetween.

12. The portable device of claim 8, wherein the central portion corresponds to the center of the corresponding LED.

13. The portable device of claim 8, wherein the edge portion has an outer circumference being at an acute angle to an optical axis from the board toward the annular lens.

14. The portable device of claim 8, wherein the camera flash lens is formed of an acrylic material.

* * * * *